(12) United States Patent
Krause et al.

(10) Patent No.: US 7,873,033 B2
(45) Date of Patent: Jan. 18, 2011

(54) METHOD AND SYSTEM FOR SUPPORTING SHARED LOCAL TRUNKING

(75) Inventors: Joel M Krause, Princeton, TX (US); Gary Lance Lockhart, Allen, TX (US); Carl T Leonard, Garland, TX (US)

(73) Assignee: Verizon Business Global LLC, Ashburn, VA (US)

( * ) Notice: Subject to any disclaimer, the term of this patent is extended or adjusted under 35 U.S.C. 154(b) by 1144 days.

(21) Appl. No.: 11/054,088

(22) Filed: Feb. 9, 2005

(65) Prior Publication Data
US 2006/0176873 A1    Aug. 10, 2006

(51) Int. Cl.
*H04L 12/66* (2006.01)

(52) U.S. Cl. .................. 370/354; 370/355; 370/356; 379/88.17

(58) Field of Classification Search .............. 379/88.17; 370/352–356
See application file for complete search history.

(56) References Cited

U.S. PATENT DOCUMENTS

| | | | |
|---|---|---|---|
| 4,922,490 A | | 5/1990 | Blakley |
| 5,901,207 A * | | 5/1999 | Pickeral ................. 379/127.01 |
| 6,064,653 A * | | 5/2000 | Farris ......................... 370/237 |
| 6,430,176 B1 * | | 8/2002 | Christie, IV ................ 370/355 |
| 6,434,143 B1 * | | 8/2002 | Donovan .................... 370/356 |
| 6,466,651 B1 | | 10/2002 | Dailey |
| 6,467,055 B1 * | | 10/2002 | Katuszonek ................. 714/43 |
| 6,594,257 B1 * | | 7/2003 | Doshi et al. ................. 370/352 |
| 6,700,964 B2 * | | 3/2004 | Schmid et al. .............. 379/189 |
| 6,804,344 B1 * | | 10/2004 | Marchiano et al. ..... 379/220.01 |
| 6,895,002 B2 * | | 5/2005 | Shah et al. .................. 370/356 |
| 6,963,557 B2 * | | 11/2005 | Knox ......................... 370/352 |
| 6,996,094 B2 * | | 2/2006 | Cave et al. .................. 370/356 |
| 7,209,551 B1 * | | 4/2007 | Schroeder et al. ........ 379/88.13 |
| 2001/0005382 A1 | | 6/2001 | Cave et al. |
| 2002/0176404 A1 | | 11/2002 | Girard |

OTHER PUBLICATIONS

Fallstrom, "E.164 Number and DNS", Internet Engineering Task Force, Network Working Group, Request for Comment 2916, Sep. 2000.
"The International Public Telecommunication Numbering Plan", International Telecommunication Union, ITU-T E.164, May 1997.
"Packet-Based Multimedia Communications Systems", International Telecommunication Union, ITU-T H.323, Jul. 2003.
International Search Report, WO 2006/086202 A3, MCI, Inc., Mar. 5, 2008, p. 3.
Supplementary European Search Report, EP 06734186, Verizon Business Global LLC, Feb. 11, 2009, pp. 1-98.

* cited by examiner

Primary Examiner—Simon Sing (57) ABSTRACT

An approach is described for providing shared trunking between a telephony gateway and an end office switch. The telephony gateway processes a packetized voice call, and interfaces a shared trunk to an end office switch (e.g., Class 5 switch) configured to switch calls over a circuit-switched telephone network. The trunk utilizes out-of-band signaling (e.g., Primary Rate Interface (PRI) signaling) in support of call establishment or teardown of the packetized voice call.

12 Claims, 5 Drawing Sheets

METHOD AND SYSTEM FOR SUPPORTING SHARED LOCAL TRUNKING

FIELD OF THE INVENTION

The present invention relates to communications, and more particularly, to local trunking.

BACKGROUND OF THE INVENTION

The popularity and convenience of the Internet has resulted in the reinvention of traditional telephony services. These services are offered over a packet switched network with minimal or no cost to the users. IP (Internet Protocol) telephony, thus, have found significant success, particularly in the long distance market. In general, IP telephony, which is also referred to as Voice-over-IP (VOIP), is the conversion of voice information into data packets that are transmitted over an IP network. Telecommunication service providers are thus challenged to integrate VOIP technology and services in their existing network. Because of the engineering constraints of legacy systems and protocols, the migration to new platforms can result in inefficient use of network resources.

Specifically, one area of concern for the service providers is the efficient use of trunks from an IP telephony gateway to a Class 5 switch. In the hierarchical scheme of traditional telephony switching, Class 5 switches are deployed to communicate directly with telephone subscribers. Conventionally, the utilization of the trunks between the gateway and the Class 5 switch has been poor, in large part because every customer requires a dedicated trunk. As a result, even if the particular customer is not utilizing the trunk, no other user can, thereby "wasting" capacity. Additionally, the provisioning process of a new trunk can be manually intensive.

Another concern is that conventional telephony signaling, such as Channel Associated Signaling (CAS) (in-band signaling) is inflexible. Notably, calling party number information cannot be relayed under this signaling protocol. This limitation significantly hinders service adoption, as typical users are accustom to such features as Caller-ID to screen their calls.

Therefore, there is a need for an efficient trunking approach. There is also a need to preserve a standard architecture to promote deployment of network services, while minimizing system complexity and cost.

SUMMARY OF THE INVENTION

These and other needs are addressed by the present invention in which a shared trunking approach between a telephony gateway and an end office switch is provided.

According to one aspect of the present invention, a communication system includes an end office switch configured to switch calls over a circuit-switched telephone network. The system also includes a telephony gateway configured to serve a plurality of users in communicating via the end office switch and to utilize out-of-band signaling in support of call establishment or teardown of a packetized voice call.

According to another aspect of the present invention, a method of call processing is disclosed. The method includes receiving a packetized voice call, at a telephony gateway, over a trunk connecting the telephony gateway with an end office switch configured to switch calls over a circuit-switched telephone network, wherein the trunk is shared by a plurality of users. The trunk utilizes out-of-band signaling in support of call establishment or teardown of the packetized voice call. The method also includes terminating the packetized voice call at a station or a network of one of the users.

According to yet another aspect of the present invention, a communication system includes an end office switched configured to switch calls over a circuit-switched telephone network. The system also includes a trunk connected to the end office switch for communicating with a telephony gateway configured to process a packetized voice call, wherein the trunk is shared by a plurality of users. The trunk utilizes out-of-band signaling in support of call establishment or teardown of the packetized voice call.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for providing shared trunking between a telephony gateway and an end office switch are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is discussed with respect to Primary Rate Interface (PRI) signaling, it should be appreciated that one of ordinary skill in the art would recognize that the present invention has applicability to other equivalent communication protocols.

According to an exemplary embodiment, an approach is provided for trunking between a local telephony gateway with an end office switch (e.g., Class 5 switch). A PRI trunk is built and provisioned between the gateway and Class 5 switch for all customers within a Rate Center (RC) and Public Safety Answering Point (PSAP) combination. With the shared PRI trunk, the Calling Party Number can advantageously be provided to the customers. The approach also reduces post-dial delay associated with establishing a Voice Over Internet Protocol (VOIP) call. Further, the telecommunications service provider can reduce port and labor costs.

Figure 1:
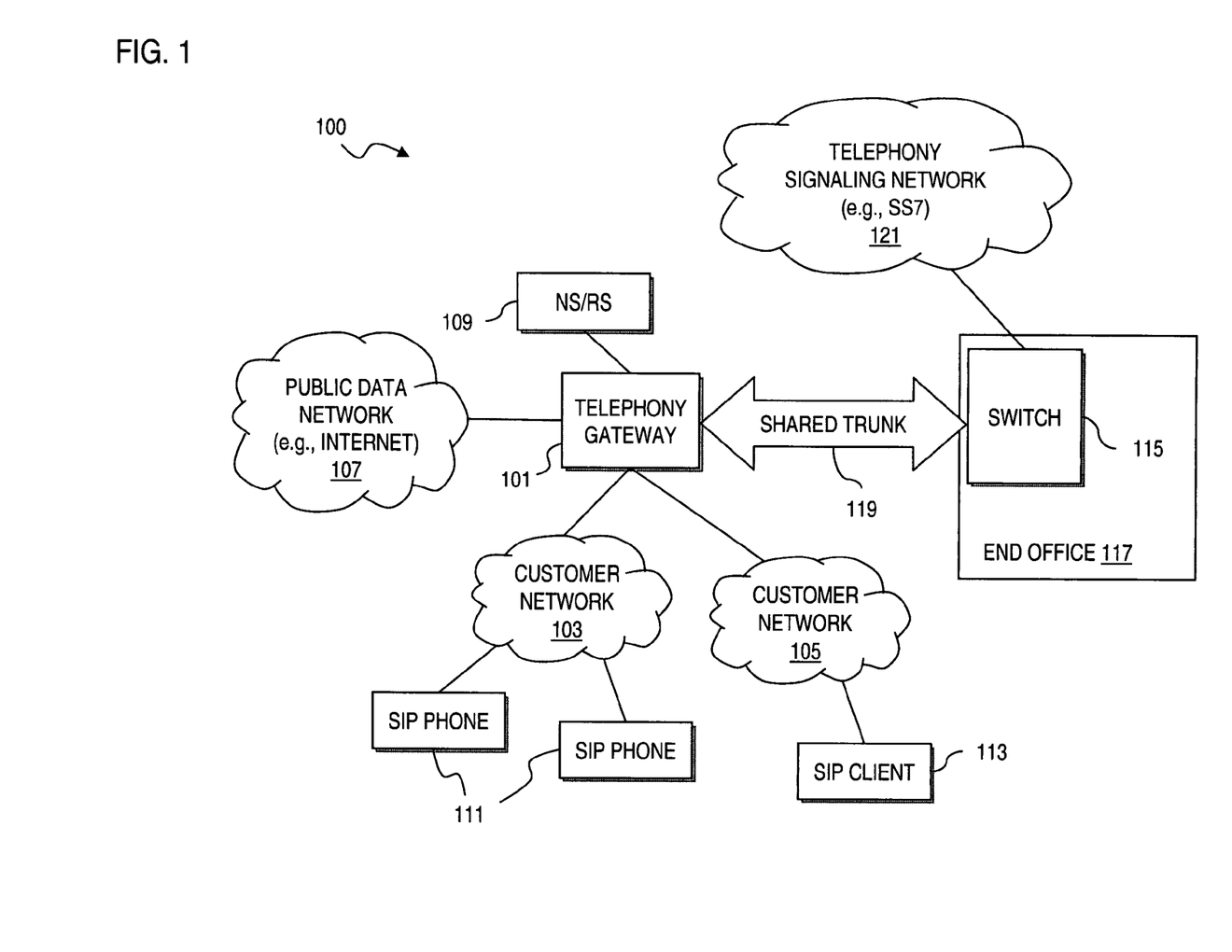
FIG. 1 is a diagram of a communication system capable of providing a shared local trunking approach, according to an embodiment of the present invention.

FIG. 1 is a diagram of a communication system capable of providing a shared local trunking approach, according to an embodiment of the present invention. Communication system 100 includes a telephony gateway 101 that supports VOIP services as well as Plain Old Telephone Service (POTS). The gateway 101 supports multiple customers, e.g., customer networks 103 and 105, by providing, according to an embodiment of the present invention, a Primary Rate Interface (PRI) to Session Initiation Protocol (SIP) gateway for interfacing between a telephony network and the Internet Protocol (IP) domain. The gateway 101 supports both origination from and termination to an IP-enabled location. In general, the gateway 101 allows for specified routing capabilities and digit manipulation rules. The components of the gateway 101 are described below with respect to FIG. 3.

Accordingly, the gateway 101 has connectivity to a public data network 107, such as the global Internet. In an exemplary embodiment, a Network Server/Redirect Server (NS/RS) 109 is employed to provide services to the gateway 101 in support of the Session Initiation Protocol (SIP). Although the NS component is shown together with the RS component, it is recognized that a server can be deployed with one or both such components. The NS acts as a SIP proxy that receives or transmits digits to the gateway 101. The RS is used to redirect traffic from one NS to other NS's (not shown). For the purpose of explanation, the NS/RS will be treated as one function within a single server 109 to either send or receive digits from the IP domain.

SIP is a standard that has been developed by the Internet Engineering Task Force (IETF). SIP is a signaling protocol that is based on a client-server model, generally meaning that clients invoke required services by messaging requests to servers that can provide the services. Similar to other IETF protocols (e.g., the simple mail transfer protocol (SMTP) and Hypertext Transfer Protocol (HTTP)), SIP is a textual, humanly readable protocol.

An alternative session establishment protocol is the H.323 protocol promulgated by the International Telecommunication Union (ITU). It is noted that neither the H.323 nor SIP protocols are limited to IP telephony applications, but have applicability to multimedia services in general. In one embodiment of the present invention, SIP is used to establish telephone calls and other types of sessions through the system 100. However, it will be apparent to those of ordinary skill in the art that the H.323 protocol (with some modifications or extensions) or other similar protocols could be utilized instead of SIP. Separate from SIP, but often used in conjunction with SIP, is the Session Description Protocol (SDP), which provides information about media streams in the multimedia sessions to permit the recipients of the session description to participate in the session.

As used herein, the term "SIP phone" refers to any client (e.g., a personal computer, a web-appliance, etc.) that is configured to provide SIP phone functionalities. SIP phones 111, which are attached to the customer 103, may take the form of standalone devices—e.g., a SIP phone may be designed and configured to function and appear like a Plain Old Telephone Service (POTS) telephone station. A SIP client 113, however, is a software client and may that run, for example, on a conventional personal computer (PC) or laptop computer. From a signaling perspective, these devices 111, 113 may operate quite similarly, with the main differences relating to the user interface. Unless otherwise stated, it is recognized that the functionalities of both the SIP phones 111 and the SIP client 113 are comparable and that the network operates similarly with either type of device.

The SIP phones 111 allow users to register and de-register, or login and logout, from the phone. In an exemplary embodiment, to provide mobility, SIP phones 111 permit usernames and passwords to be entered for visitors. Logging in allows the SIP phone 111 to assume the profile of the visitor. By logging in, incoming calls to the visitor's profile are directed to the phone. When a visitor logs in, the SIP phones 111 register the visitor with the NS/RS server 109. Any incoming call to any of the profiles registered by the phone 111 can be directed to the phone 111. The NS/RS server 109 may respond similarly to both situations where a user is logged in as a visitor or where the user is logged in to their usual home device, if there is one.

With respect to E.164 and Domain Name Service (DNS) addressing, the SIP phones 111 may support ENUM (Electronic Number) service, which is be used to route calls that originate in the IP domain or with ENUM-enabled networks. ENUM service is detailed in IETF RFC 2916, entitled "ENUM", which is incorporated herein by reference in its entirety.

The gateway 101 communicates with a telephone switch (e.g., Class 5 switch) 115 within an end office 117. According to one embodiment of the present invention, the gateway 101 utilizes a shared trunk 119 to the Class 5 switch 115, which interfaces with a telephony signaling network 121, such as Signaling System 7 (SS7). In an exemplary embodiment, the shared trunk 119 utilizes out-of-band signaling; e.g., Primary Rate Interface (PRI) trunk signaling, which is a part of the Integrated Services Digital Network (ISDN) service. The structure of the PRI trunk 119 is shown in FIG. 2.

Conventionally, the communication between a telephony gateway and a Class 5 switch is supported by a trunk utilizing Channel Associated Signaling (CAS). Under this architecture, the customer DS0's must be dedicated from the Shared Local Gateway (SLG) to the Class 5 switch for all inbound traffic and local outbound traffic. This requires a trunk to be built between the gateway and the Class 5 switch for every customer, resulting in poor trunk utilization. Also, provisioning of these trunks entails a manually intensive process. The CAS trunk cannot support Calling Party Number. These drawbacks are overcome by the shared trunking approach used in the system 100.

Figure 2:
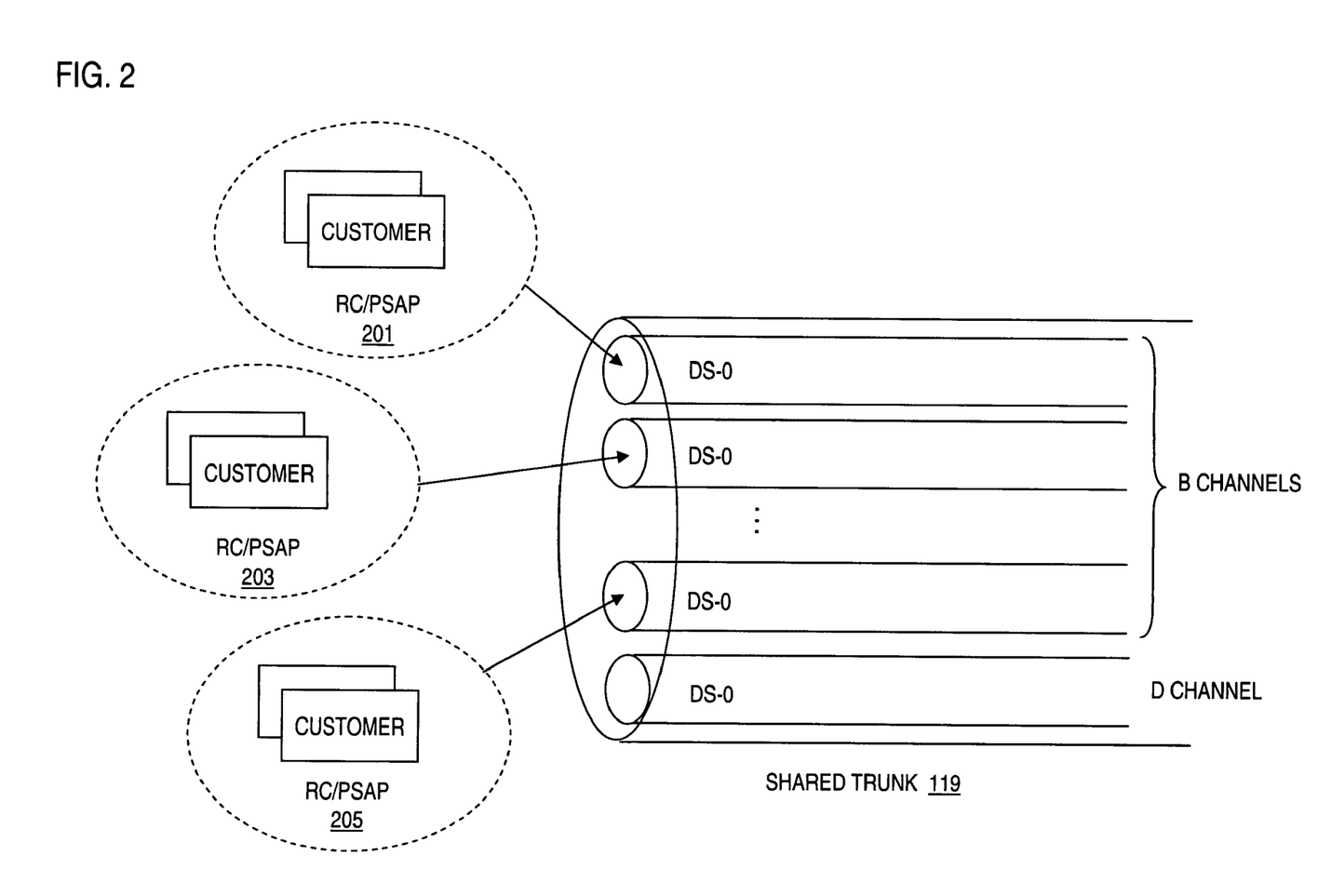
FIG. 2 is a diagram of a trunk with channels allocated according to Rate Center (RC) and Public Safety Answering Point (PSAP), in accordance with an embodiment of the present invention.

FIG. 2 is a diagram of a trunk with channels allocated according to Rate Center (RC) and Public Safety Answering Point (PSAP), in accordance with an embodiment of the present invention. The PRI trunk 119, in this example, includes multiple B channels and a single D channel. In the United States, for example, the trunk 119 would have 23 B channels at 64 kbps each; the D channel is also 64 kbps. In other parts of the world, the PRI trunk 119 would utilize 30 B channels at 56 kbps, in which the D channel is 64 kbps.

According to one embodiment of the present invention, customers within the same Rate Center (RC)/Public Safety Answering Point (PSAP) combination 201-205 share DS0's within the PRI trunk 119 providing connectivity between the gateway 101 and the Class 5 switch 115. This capability to share capacity results in efficient utilization and associated cost savings, in that a single trunk can be shared rather than procuring separate trunks for separate customers.

Another important advantage is that the trunk 119 can support the passing of the Calling Party Number. In addition, in a SIP call setup, the PRI trunk 119 minimizes post dial delay. Further, the provisioning of the DS0's within the shared trunk 119 is less manually intensive than the traditional CAS trunking approach.

Figure 3:
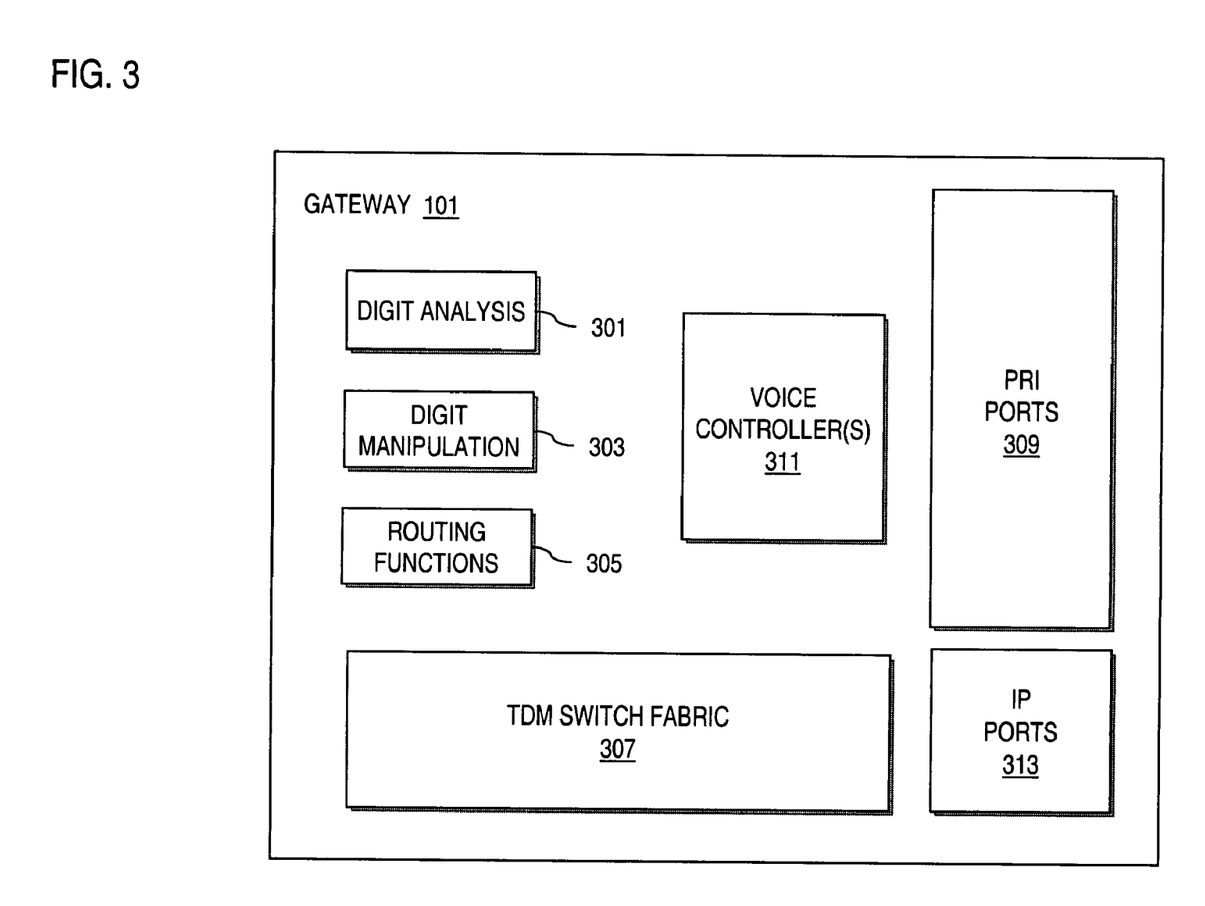
FIG. 3 is a diagram of the components of a gateway used in the system of FIG. 1.

FIG. 3 is a diagram of the components of a gateway used in the system of FIG. 1. As mentioned, the gateway 101 provides digit manipulation functions and routing services via a digit analysis module 301, a digit manipulation module 303, and a routing module 305. The gateway 101 also includes a Time Division Multiplexing (TDM) switch fabric 307 for switching voice streams, and serving as the transition point between the physical bi-directional TDM interfaces and the IP domain. One or more voice ports (i.e., PRI ports) 309 are provided to physically interface the PRI trunk 119. The gateway 101 also includes a voice controller 309 for controlling the PRI ports 309. IP ports 313 provide connectivity to IP-domains, such as the public data network 107, or a customer network (e.g., network 103).

The modules 301-305 support inbound and outbound POTS or VOIP traffic. With respect to ingress calls (i.e., circuit-switched network to SIP termination), the modules 301-305 collect all digits from the Class 5 switch 115 and send the digits to the NS/RS server 109 in the IP domain. For egress calls (i.e., SIP to circuit-switched network termination), the modules 301-305 collect all digits from the NS/RS server 109 in the IP domain and forwards the digits to the Class 5 switch 115.

Figure 4:
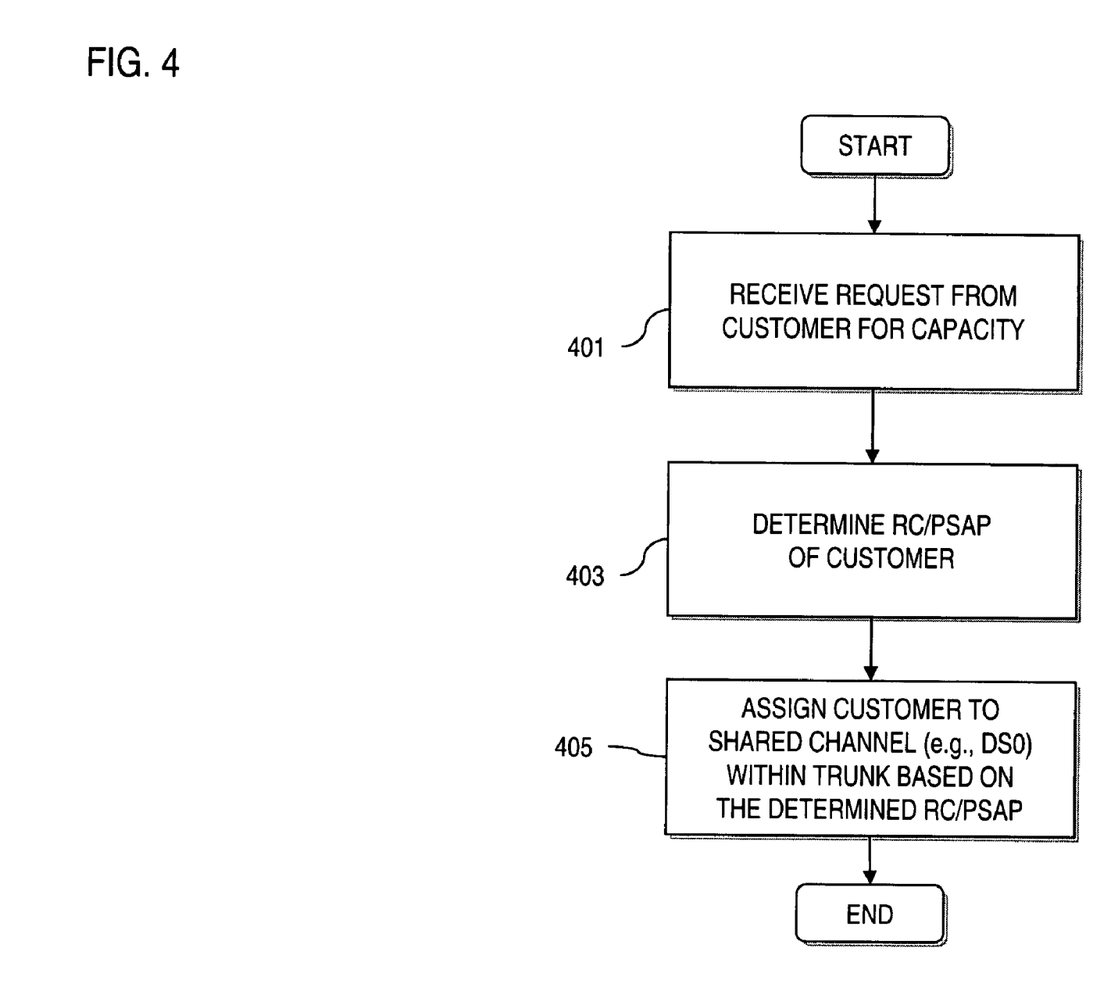
FIG. 4 is a flowchart of a process for provisioning capacity in the system of FIG. 1.

FIG. 4 is a flowchart of a process for provisioning capacity in the system of FIG. 1. In step 401, a request for capacity, such as one or more DS0's, is received from a customer. The RC/PSAP combination is determined for the customer, as in step 403. Thereafter, the capacity within the shared PRI trunk 119 is allocated, as in step 405, to the customer to meet the customer's bandwidth requirements.

When provisioning the shared trunk 119, a PRI Group is created. A PRI Group is the PRI trunk 119 that is built for a single voice controller 311 to serve a particular RC/PSAP. The combination of the voice controller 311 and the PRI Group provides uniqueness for every PRI Group created. When a PRI Group is created, an interface serial and voice port is automatically created; although both are created, they are identified differently.

Contrasting to CAS trunking, customers using PRI shared trunking do not have a dedicated set number of DS0's provisioned on the gateway 101. Each customer shares DS0's on a particular PRI trunk 119. For 911 and E911 purposes, and because each PRI group terminates to one RC/PSAP combination, only customers that are served by that RC/PSAP combination can "share" the PRI trunk 119. The high-level call flows for PRI shared trunking are now described.

For egress calls, all local trunk group routing requires the identification of the shared trunk's 7-digit trunk ID. This number, which is the numeric identifier specific to a RC/PSAP combination, is obtained prior to any provisioning of local customer traffic. This 7-digit trunk ID is used to perform a pattern-match.

All local trunk groups requiring an egress termination have a corresponding 7-digit trunk ID pre-pended to a Request URI (Uniform Resource Identifier) of an INVITE message from the NS/RS server 109. The gateway 101 strips the 7-digit trunk ID and passes the remaining digits to the appropriate Class5 switch 115.

For ingress calls on a local trunk group, the Class 5 switch 115 sends a 10-digit dialed number to the gateway 101. The gateway 101 prepends a +1 to the number indicating that it is of PSTN origination, for example. Once the "+1" is prepended to the number, the call is routed to an NS/RS proxy (e.g., NS/RS server 109) within the EP domain.

The above approach advantageously provides a mechanism for efficiently utilizing a shared (or common) trunk to support telephony services.

Figure 5:
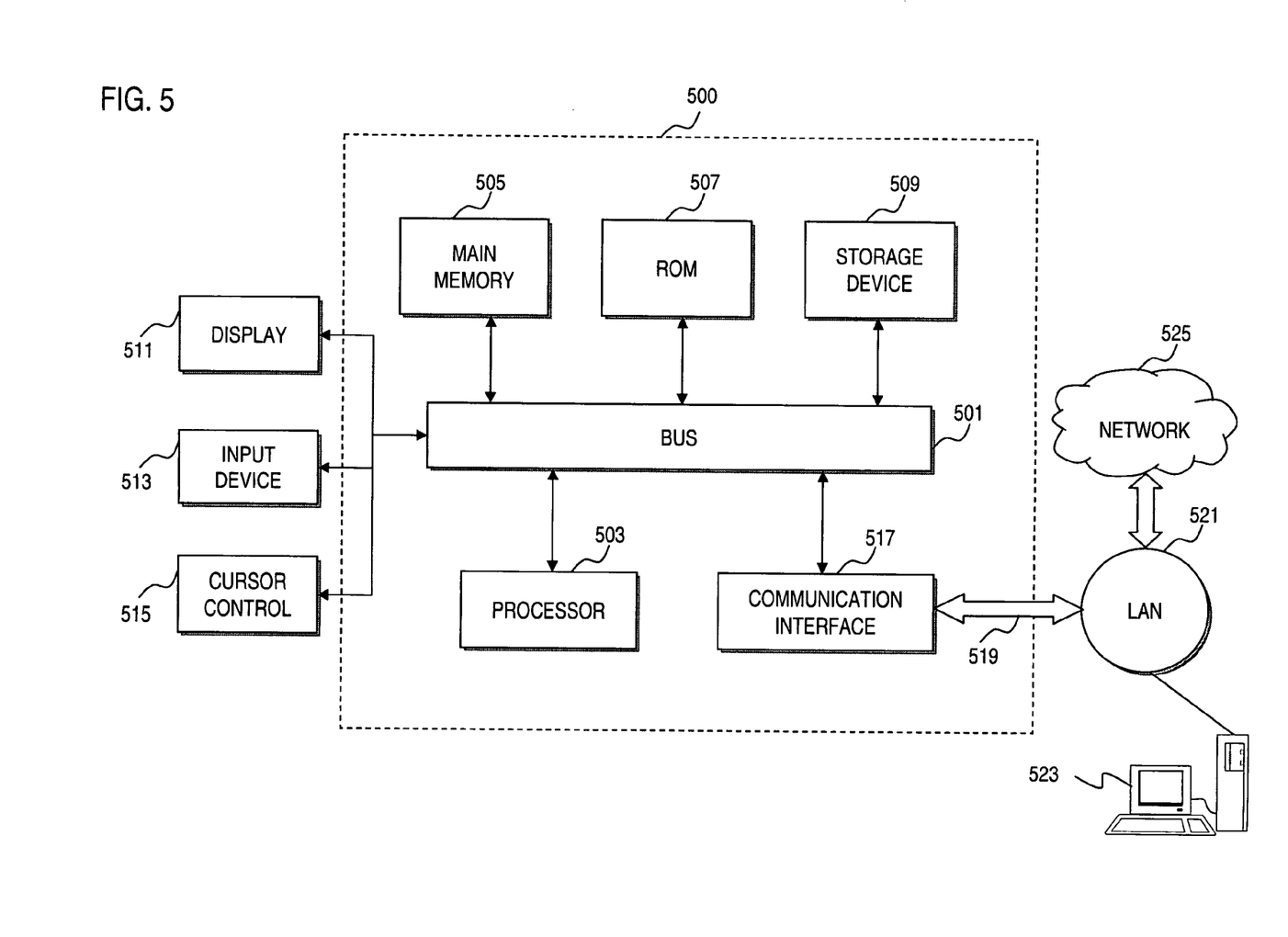
FIG. 5 is a diagram of a computer system that can be used to implement an embodiment of the present invention.

FIG. 5 illustrates a computer system 500 upon which an embodiment according to the present invention can be implemented. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to one embodiment of the invention, the processes of the gateway 101 and the various clients and servers in the system of FIG. 1 are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the present invention. Thus, embodiments of the present invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the present invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A communication system, comprising:
   an end office switch configured to switch calls over a circuit-switched telephone network; and
   a telephony gateway configured to serve a plurality of users over a shared local trunk in communicating via the end office switch, the shared local trunk utilizing out-of-band signaling in support of call establishment or teardown of a packetized voice call,
   wherein the telephone gateway is further configured to determine Rate Center (RC)/Public Safety Answering Point (PSAP) combinations for the plurality of users, each user of the plurality of users having a RC/PSAP combination, and
   wherein the trunk comprises a plurality of channels, each of the plurality channels allocated to the plurality of users within a determined RC/PSAP combination.

2. A system according to claim 1, wherein the trunk supports Primary Rate Interface (PRI) signaling and provides connectivity between the end office switch and the telephony gateway.

3. A system according to claim 1, wherein the packetized voice call is established according to a Session Initiation Protocol (SIP).

4. A system according to claim 1, wherein a Calling Party Number associated with the packetized voice call is transmitted to a network or a station of one of the users.

5. A method of call processing, the method comprising:
   receiving a packetized voice call, at a telephony gateway, over a local trunk connecting the telephony gateway with an end office switch configured to switch calls over a circuit-switched telephone network,
   determining Rate Center (RC)/Public Safety Answering Point (PSAP) combinations for a plurality of users, each user of the plurality of users having a RC/PSAP combination,
   wherein the trunk is shared by the plurality of users, the trunk utilizing out-of-band signaling in support of call establishment or teardown of the packetized voice call; and
   terminating the packetized voice call at a station or a network of one of the users, wherein the trunk comprises a plurality of channels, each of the plurality channels allocated to the plurality of users within a determined RC/PSAP combination.

6. A method according to claim 5, wherein the trunk supports Primary Rate Interface (PRI) signaling.

7. A method according to claim 5, wherein the packetized voice call is established according to a Session Initiation Protocol (SIP).

8. A method according to claim 5, wherein the trunk transports a Calling Party Number associated with the packetized voice call to the network or the station.

9. A communication system, comprising:

an end office switched configured to switch calls over a circuit-switched telephone network; and a local trunk connected to the end office switch for communicating with a telephony gateway configured to process a packetized voice call and determine Rate Center (RC)/Public Safety Answering Point (PSAP) combinations for a plurality of users, wherein the trunk is shared by a plurality of users being within the same RC/PSAP combination, the trunk utilizing out-of-band signaling in support of call establishment or teardown of the packetized voice call.

10. A system according to claim 9, wherein the trunk supports Primary Rate Interface (PRI) signaling.

11. A system according to claim 9, wherein the packetized voice call is established according to a Session Initiation Protocol (SIP).

12. A system according to claim 9, wherein the trunk transports a Calling Party Number associated with the packetized voice call to a network or a station of one of the users.

* * * * *